(12) United States Patent
Tajima

(10) Patent No.: US 6,238,314 B1
(45) Date of Patent: May 29, 2001

(54) POWER TRANSMISSION BELT AND METHOD OF FABRICATING THE SAME

(75) Inventor: Yoshitaka Tajima, Kobe (JP)

(73) Assignee: Bando Chemical Industries, Ltd., Kobe (JP)

( * ) Notice: Subject to any disclaimer, the term of this patent is extended or adjusted under 35 U.S.C. 154(b) by 0 days.

(21) Appl. No.: 09/298,995

(22) Filed: Apr. 26, 1999

(30) Foreign Application Priority Data

May 25, 1998 (JP) .................................................. 10-143245

(51) Int. Cl.$^7$ ....................................................... F16G 3/10
(52) U.S. Cl. .......................... 474/253; 474/258; 474/260; 474/268
(58) Field of Search ...................... 474/253, 256, 474/260, 266, 237, 254, 263, 268, 271, 264; 156/272.8, 257, 304.1, 304.5, 258, 273.3, 137; 428/192, 126, 58, 60

(56) References Cited

U.S. PATENT DOCUMENTS

| | | | |
|---|---|---|---|
| 1,474,666 | * | 11/1923 | Edwards ............................ 474/266 X |
| 2,292,526 | * | 8/1942 | Kindlimann .......................... 474/266 |
| 4,434,019 | * | 2/1984 | Hollaway, Jr. .................... 474/260 X |
| 4,522,869 | * | 6/1985 | Anderson, Jr. et al. ............. 474/260 |
| 5,688,355 | * | 11/1997 | Yu .................................. 156/272.8 X |
| 5,698,358 | * | 12/1997 | Yu .................................. 156/304.5 X |
| 5,746,674 | * | 5/1998 | Tajima et al. ........................ 474/253 |
| 5,776,026 | * | 7/1998 | Tajima et al. .................... 474/253 X |

FOREIGN PATENT DOCUMENTS

| | | |
|---|---|---|
| 0 481 652 | 4/1992 | (EP) . |
| 0 742 383 | 11/1996 | (EP) . |
| 58-2447 | 6/1956 | (JP) . |
| 59-93549 | 5/1984 | (JP) . |
| 59-93550 | 5/1984 | (JP) . |
| 4-151048 | 5/1992 | (JP) . |
| 6-73498 | 10/1994 | (JP) . |
| 7-19289 | 1/1995 | (JP) . |
| 8-303528 | 11/1996 | (JP) . |

* cited by examiner

Primary Examiner—David A. Bucci
Assistant Examiner—Marcus Charles
(74) Attorney, Agent, or Firm—Nixon Peabody LLP; Thomas W. Cole

(57) ABSTRACT

In a power transmission belt the outer periphery or the inner periphery of which is covered with a cover fabric, the cover fabric is cylindrically formed of a plurality of fabric pieces joined one to another, one of joint sections of the cover fabric has a lap joint structure that adjacent fabric pieces are lap joined at corresponding ends thereof, and the other one or more joint sections of the cover fabric each have a butt joint structure that adjacent fabric pieces are butt seamed at corresponding ends thereof.

2 Claims, 9 Drawing Sheets

POWER TRANSMISSION BELT AND METHOD OF FABRICATING THE SAME

FIELD OF THE INVENTION

This invention relates to a power transmission belt and method of fabricating the same.

DESCRIPTION OF THE PRIOR ART

As an example of a power transmission belt, Japanese Patent Application Laid-Open Gazette No.8-303528 discloses a V-ribbed belt which includes an adhesion rubber having a tension member embedded therein, a top fabric covering the back face (outer face) of the adhesion rubber, and a rib rubber formed over the inner face of the adhesion rubber and having a plurality of ribs extending in a belt lengthwise direction.

The above-mentioned Gazette further discloses a technique that a plurality of fabric pieces, obtained by cutting a plain weave fabric on the bias, are joined one after another to form a strip in which warp yarns and weft yarns are diagonally oriented with respect to a lengthwise direction of the strip and in mutually opposite directions, the strip is joined at both ends into a cylinder, and the cylinder is set as a material for the top fabric onto a drum for forming the belt. The joint line between the bias cut fabric pieces in the top fabric extends diagonally with respect to the belt lengthwise direction, while the joint line between both the ends of the strip extends in a belt widthwise direction. The joint lines of these two types both have a butt joint structure in which the ends of the fabric pieces or the ends of the strip are butt seamed.

Further, until the butt joint structure as above-mentioned was employed for the top fabric, there had been employed a lap joint structure that the ends of the bias cut fabric pieces are joined in overlapping relation with each other and both the ends of the strip are also joined in overlapping relation with each other.

However, the butt joint structure has the following problems.

In FIG. 4, a reference numeral 11 denotes a strip obtained by joining bias cut fabric pieces 12 one after another, and a reference numeral 13 denotes a diagonal joint line of a butt joint structure. If a portion of the strip 11 is cut away along two lines A1, A2 and the resultant cut fabric is butt joined at both ends into a cylinder, a three-forked part develops at the point where a widthwise joint line 16 formed through the formation of the cylinder meets the diagonal joint line 13 as shown in FIG. 11 in which the cylinder 27 is set onto a drum 15. FIG. 12 shows a cylinder 28 formed in the case where a portion of the strip 11 is cut away along two lines B1, B2 in FIG. 4. In this case, two three-forked parts develop.

However, when the cut fabric is butt seamed at both ends into a cylinder and the resultant cylinder 27, 28 is set onto the drum 15, the steps and works of fabricating the belt are complicated. This not only increases the number of steps but also requires facilities for such work. Particularly in a cut fabric one or both of surfaces of which are previously coated with unvulcanized rubber, when the cut fabric is seamed in a cylinder, the unvulcanized rubber-coated surface of the cut fabric may come to the inner surface of the cylinder. In this case, the seaming work becomes difficult due to stickiness of the unvulcanized rubber. In addition, if the stiffness of the cylinder 27, 28 is small, the work of setting the cylinder onto the drum 15 becomes difficult. In these cases, enhancement in productivity is hindered. Furthermore, the three-forked part is small in strength and detracts from the appearance of the belt.

To cope with these problems, it can be considered to avoid the emergence of a three-forked part by adjusting the cutting positions of the strip 11 so as not to meet the butt joint line 13. In this case, however, many portions of the strip 11 are not used for top fabrics, resulting in heavy losses. In addition, such adjustment deteriorates productivity.

On the other hand, the lap joint structure has the following problems.

In FIG. 13, a reference numeral 31 denotes a strip obtained by lap joining bias cut fabric pieces 12 one after another, and a reference numeral 33 denotes a diagonal joint line in a lap joint structure of the bias cut fabric pieces 12. If a portion of the strip 31 is cut away along two lines A1, A2 in FIG. 13 and the resultant cut fabric is lap joined at both ends into a cylinder, a three-forked part develops at the point where a widthwise joint line 36 formed through the formation of the cylinder meets the diagonal joint line 33 as shown in FIG. 14 in which the cylinder 34 is set onto the drum 15. In the three-forked part, fabric portions of the cylinder meeting together therein are triply overlapped. FIG. 15 shows a cylinder 37 formed in the case where a portion of the strip 31 is cut away along two lines B1, B2 in FIG. 13. In this case, a forked part where fabric portions of the cylinder are quadruply overlapped develops.

Such overlapping of the fabric portions in each joint section involves an inconvenience of increasing the entire volume of the belt. Further, the forked part where the fabric portions are overlapped three or four deep results in the emergence of a hard portion locally thickened in the top fabric. At the portion, a bulge develops on the back face of the belt or the position of the tension member is readily displaced slightly inside the belt. This is disadvantageous to uniformity in section of the belt, readily produces vibrations and sounds during the belt run, and exerts a bad influence on the belt life.

SUMMARY OF THE INVENTION

This invention provides for a power transmission belt and method of fabricating the same whereby the above-mentioned problems are solved, and applies a combination of the butt joint structure and the lap joint structure to a cover fabric of a power transmission belt.

Specifically, an aspect of the present invention provides for a power transmission belt the outer periphery or the inner periphery of which is covered with a cover fabric. The power transmission belt is characterized in that the cover fabric is cylindrically formed of a plurality of fabric pieces joined one to another, one of joint sections of the cover fabric has a lap joint structure that adjacent fabric pieces are lap joined at corresponding ends thereof, and the other one or more joint sections of the cover fabric each have a butt joint structure that adjacent fabric pieces are butt seamed at corresponding ends thereof.

With this arrangement, since one of the plurality of joint sections has the lap joint structure, this eliminates the need to previously form the cover fabric into a cylinder before setting it onto a drum for forming the belt, the cover fabric can be set onto the drum in a manner to be wound thereon, and the lap joint structure can be employed for joining both ends of the cover fabric to each other. In addition, since one of the joint sections has the lap joint structure while the other one or more joint sections each have the butt joint structure, this avoids the butt joint sections from meeting each other to develop a three-forked part and avoids portions of the cover fabric from overlapping three or more deep. Accordingly, the power transmission belt of the present invention is advantageous for ensuring the belt strength and reducing vibrations and noises, and can be readily fabricated.

When the cover fabric is a top fabric covering the back face of the belt, the cover fabric may be formed of a plain weave fabric in which warp yarns and weft yarns are diagonally oriented with respect to the belt lengthwise direction and in mutually opposite directions, the cover fabric may include one or more diagonal joint lines extending diagonally with respect to the belt lengthwise direction and one widthwise joint line extending in the belt widthwise direction, the diagonal joint line may have the butt joint structure, and the widthwise joint line may have the lap joint structure.

In the above-mentioned prior art techniques, the coexistence of the diagonal joint line and the butt joint line on a single top fabric leads to the possibility of emergence of the above-mentioned three-forked part, triply overlapped part and quadruply overlapped part. However, according to the arrangement of the present invention, the emergence of such parts can be avoided.

Another aspect of the present invention provides for a method of fabricating the above-mentioned power transmission belt. The method is characterized by comprising the steps of: cutting a plain weave fabric, on one or both surfaces of which an unvulcanized rubber layer is provided, diagonally with respect to warp yarns thereof (so-called "bias cutting") and at established intervals thereby forming a plurality of fabric pieces; butt seaming the plurality of fabric pieces at side edges extending along the warp yarns thereof one after another thereby forming a strip; cutting the strip in lengths; forming a cylindrical belt material on a drum for forming the belt by winding the cut fabric obtained from the strip on the drum in a manner of putting a winding end portion of the cut fabric on a winding start portion thereof and sequentially winding an unvulcanized rubber sheet, a cord for a tension member and an unvulcanized rubber sheet over the cut fabric wound on the drum; and vulcanizing the unvulcanized rubber sheets of the belt material.

With this method, the joint line between the fabric pieces constituting the strip comes to a diagonal joint line diagonally extending with respect to the belt lengthwise direction in a power transmission belt as a final product, while the joint line between both ends of the cut fabric wound on the drum comes to a widthwise joint line extending in the belt widthwise direction in the power transmission belt. In this case, since the diagonal joint line has the butt joint structure and the widthwise joint line has the lap joint structure, any three-forked part, any triply overlapped part and any quadruply overlapped part do not develop unlike the prior art. Needless to say, since the setting of the cover fabric onto the drum is performed in a winding manner, the cover fabric can be readily set on the drum without the need for any special facilities even if it has stickiness or small stiffness. Accordingly, a power transmission belt excellent in strength and small in vibration and noise can be readily obtained.

DESCRIPTION OF PREFERRED EMBODIMENTS

Embodiments of the present invention will be described below with reference to the drawings.

<Structure of Power Transmission Belt>

Figure 1:
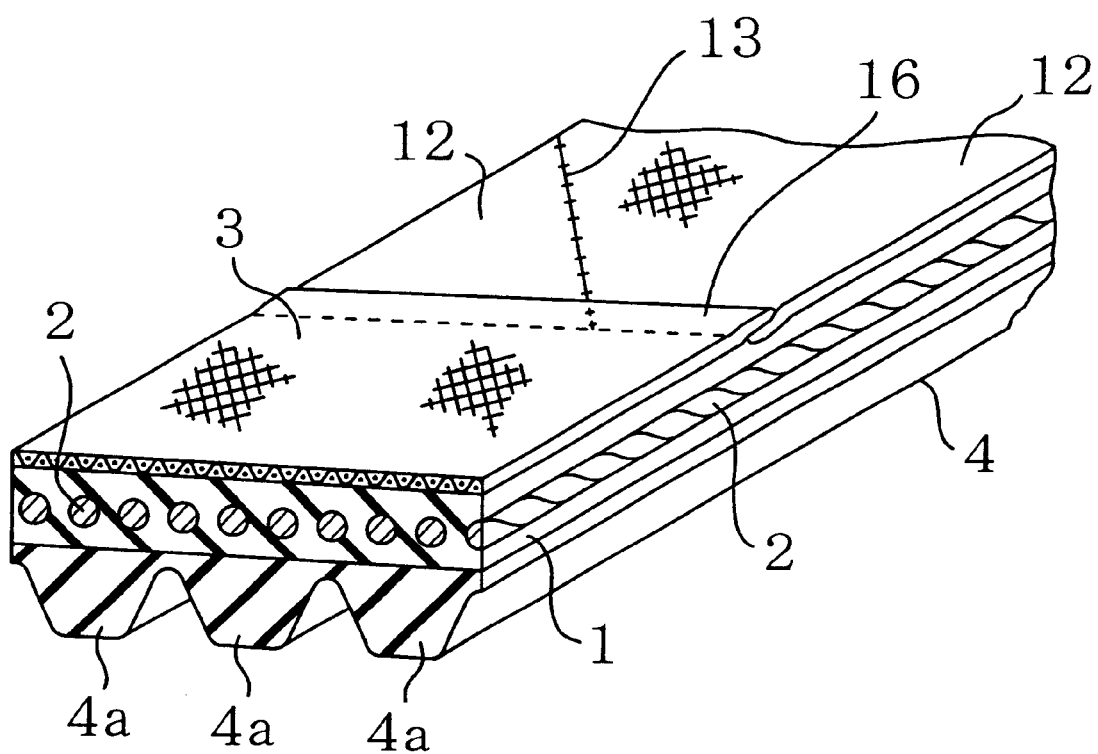
FIG. 1 is a partly cross-sectional perspective view showing a belt according to an embodiment of the present invention.

FIG. 1 shows an endless V-ribbed belt as an example of a power transmission belt. In the figure, a reference numeral 1 denotes an adhesion rubber having a tension member 2 embedded therein, a reference numeral 3 denotes a top fabric covering the back face of the adhesion rubber 1, and a reference numeral 4 denotes a rib rubber formed over the inner face of the adhesion rubber 1. The tension member 2 is spirally arranged so as to extend in the belt lengthwise direction while shifting at a predetermined pitch in the belt widthwise direction. The rib rubber 4 includes three ribs 4a extending in the belt lengthwise direction in parallel with each other.

The top fabric 3 is formed by joining a plurality of fabric pieces 12 one after another, and has a diagonal joint line 13 extending diagonally with respect to the belt lengthwise direction and a widthwise joint line 16 extending in the belt widthwise direction. The diagonal joint line 13 has a butt joint structure that adjacent ends of the fabric pieces 12 are butt seamed by an overlooking sewing machine. The widthwise joint line 16 has a lap joint structure that adjacent ends of the fabric pieces 12 are put one upon another and the overlapped portions are bonded under large pressure through the adhesion rubber. One end of the diagonal joint line 13 meets the widthwise joint line 16.

<Method of Fabricating Power Transmission Belt>

Figure 2:
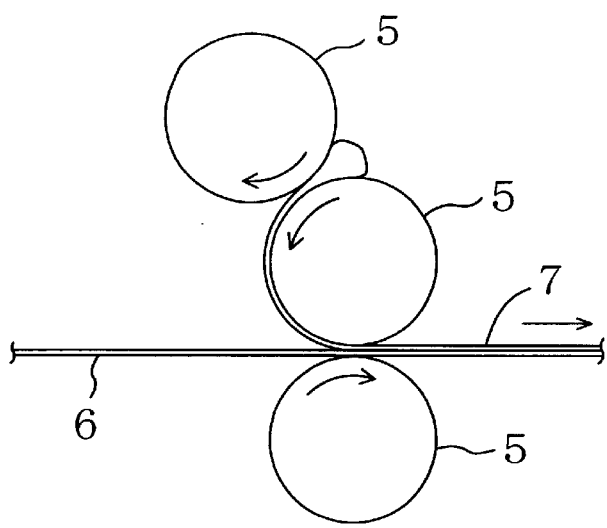
FIG. 2 is a side view showing a rubber fractioning operation conducted to a fabric in the above embodiment.

As shown in FIG. 2, an unvulcanized rubber layer 7 is provided over one surface of a plain weave fabric 6 by frictioning with a calender in which three rolls 5, 5, 5 are disposed in the form of an inverted L.

Figure 3:
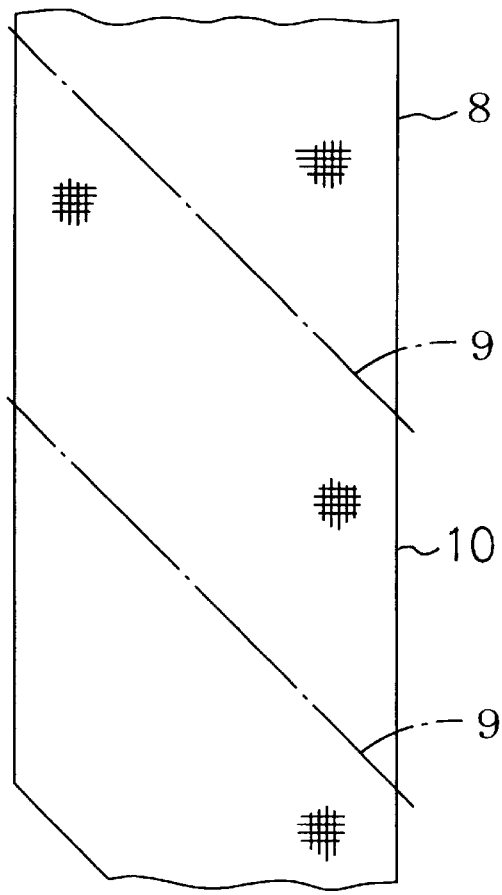
FIG. 3 is a plan view showing bias cutting lines of a rubber-coated fabric in the above embodiment.

Then, as shown in FIG. 3, a rubber-coated fabric 8 obtained through the frictioning is cut at an angle of 45 degrees with respect to a direction of the warp yarns (by bias cutting) and at established intervals. In FIG. 3, a reference numeral 9 denotes a cutting line.

Figure 4:
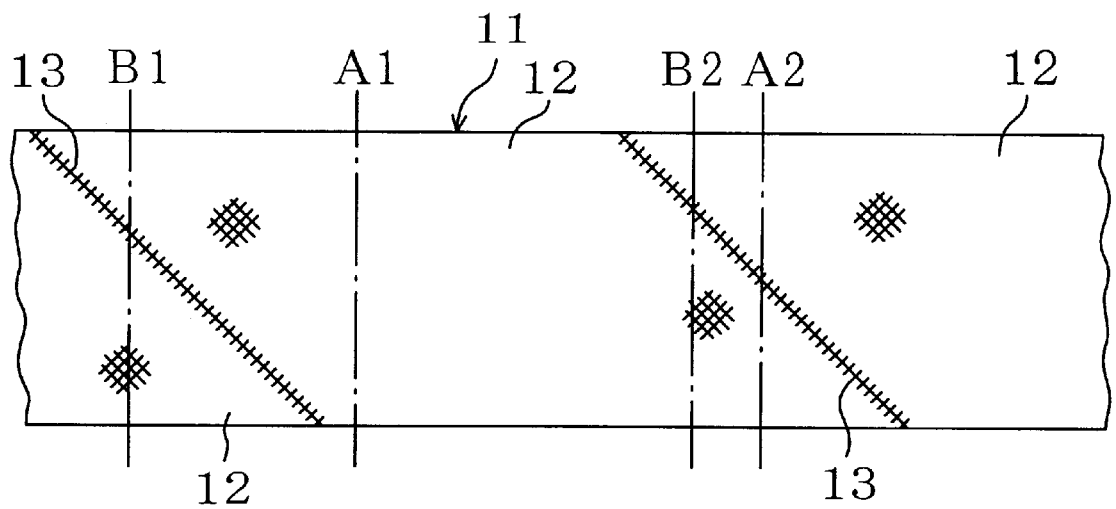
FIG. 4 is a plan view showing cutting lines of a rubber-coated strip in the above embodiment.

Next, as shown in FIG. 4, a plurality of rubber-coated fabric pieces 12 obtained by the bias cutting are butt seamed, at side edges (indicated by 10 in FIG. 3) extending along the warp yarns, one after another by the overlooking sewing machine, thereby forming a rubber-coated strip 11. As a result, the diagonal joint line 13 between the fabric pieces 12 in the strip 11 constitutes a butt joint structure. Then, the strip 11 is cut along the width thereof in lengths, resulting in the formation of materials for top fabrics.

Figure 5:
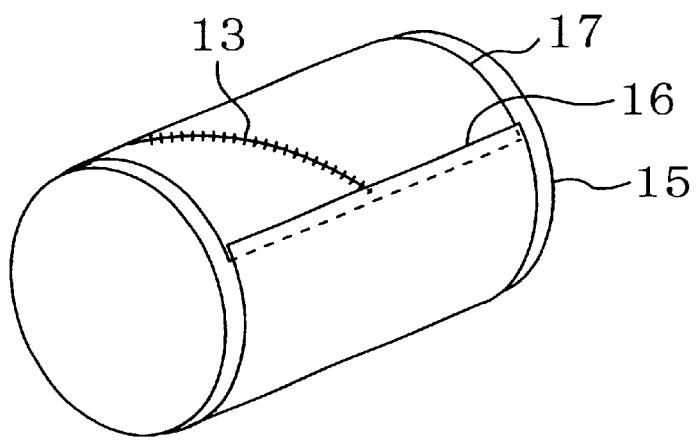
FIG. 5 is a perspective view showing a top fabric of the embodiment wound on a drum for forming the belt.

Next, as shown in FIG. 5, the resultant material 17 for a top fabric is wound on a drum 15 for forming the belt with the widthwise direction thereof oriented in an axial direction of the drum, the winding end portion of the material 17 is put on the winding start portion thereof, and the resultant overlapping portions of the material 17 are bonded under pressure by a hand roller. As a result, the widthwise joint line 16 of the material 17 for a top fabric constitutes a lap joint structure. The material 17 for a top fabric shown in FIG. 5 is obtained by cutting away a portion of the strip 11 shown in FIG. 4 along the line A1 not crossing the diagonal joint line 13 and the line A2 crossing the diagonal joint line 13. Accordingly, in this material 17 for a top fabric, the diagonal joint line 13 meets the widthwise joint line 16.

Thereafter, an unvulcanized rubber sheet for forming the adhesion rubber layer, the tension member 2, an unvulcanized rubber sheet for forming the adhesion rubber layer and an unvulcanized rubber sheet for forming the rib rubber 4 are wound in this order, thereby forming a cylindrical belt material on the drum 15. Then, heat and pressure are externally applied to the belt material so that the unvulcanized rubber parts of the belt material are vulcanized.

A cylindrical vulcanized material obtained in the above manner is removed from the drum 15, and circumferential grooves are formed on the surface of the rib rubber by grinding, thereby forming ribs 4a. Thereafter, the resultant material is cut in round pieces thereby obtaining a target V-ribbed belt.

Figure 6:
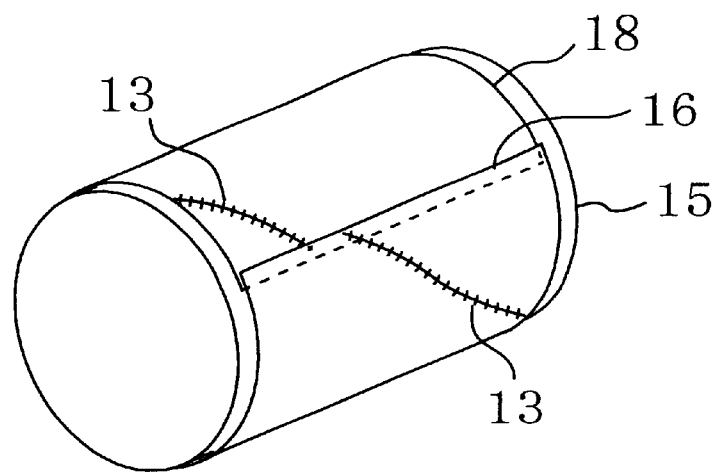
FIG. 6 is a perspective view showing a top fabric of another embodiment wound on the drum for forming a belt.

FIG. 6 shows another material 18 for a top fabric, obtained by cutting away a portion of the strip 11 shown in FIG. 4 along the lines B1, B2 respectively crossing the different diagonal joint lines 13, in which the material 18 is wound on the drum 15. In this case, both of two diagonal joint lines 13, 13 meet the widthwise joint line 16 in the resultant power transmission belt.

<Breaking Test for Top Fabric>

Figure 7:
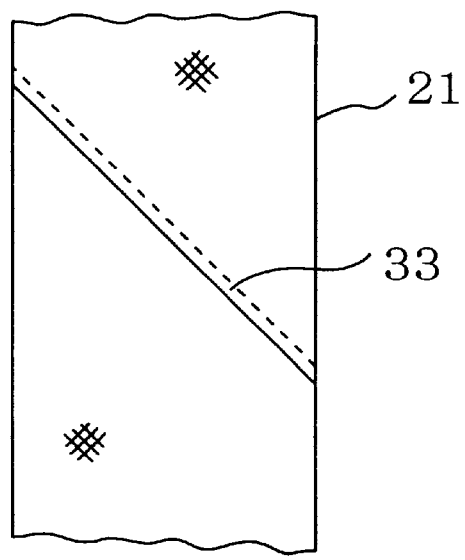
FIG. 7 is a plan view partly showing the belt subjected to a top fabric breaking test.
Figure 8:
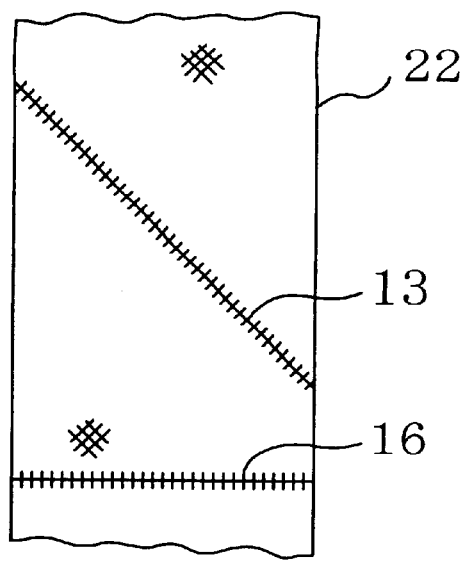
FIG. 8 is a plan view partly showing another belt subjected to the top fabric breaking test.
Figure 9:
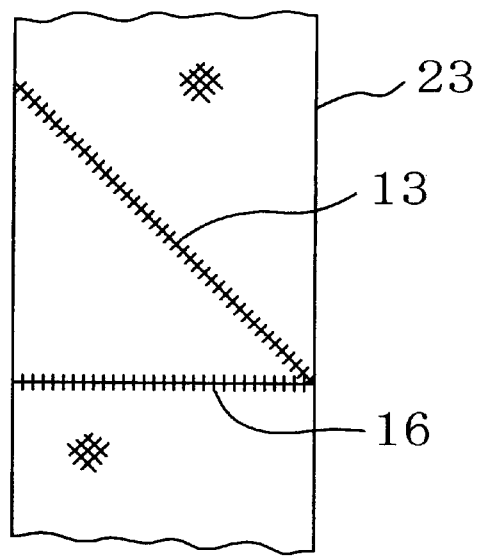
FIG. 9 is a plan view partly showing still another belt subjected to the top fabric breaking test.
Figure 10:
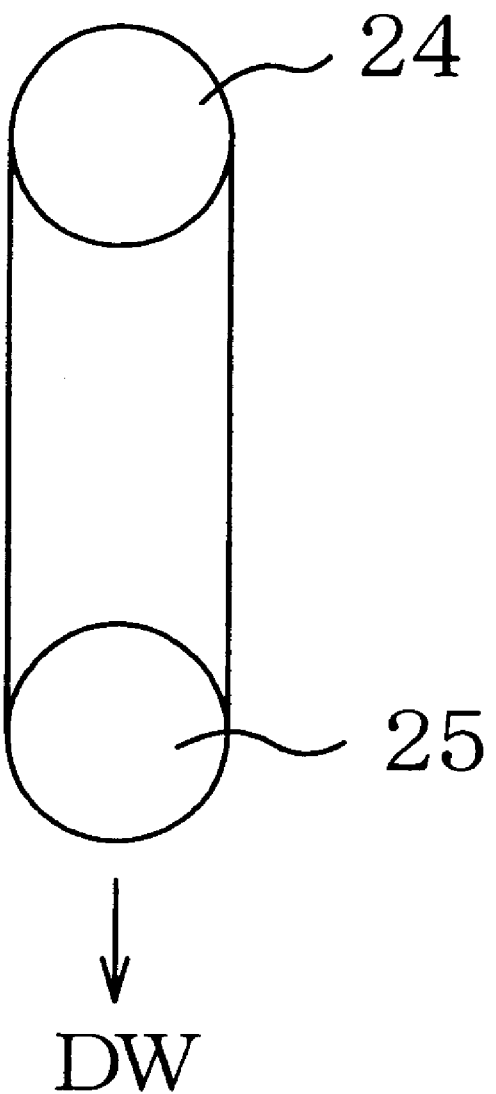
FIG. 10 is a side view illustrating the condition of the top fabric breaking test.
Figure 11:
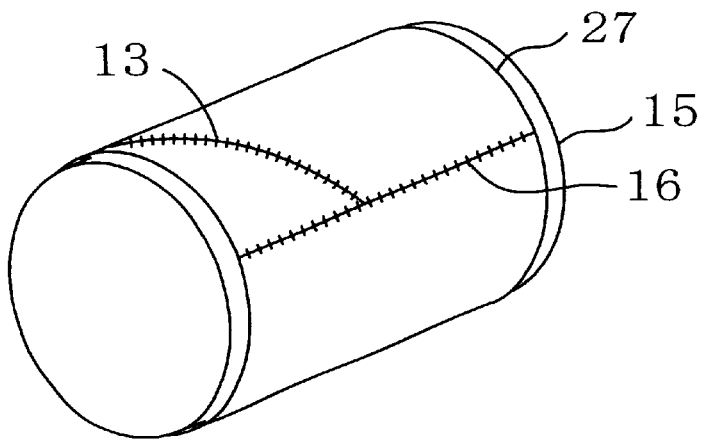
FIG. 11 is a perspective view showing a conventional top fabric wound on the drum for forming a belt.
Figure 12:
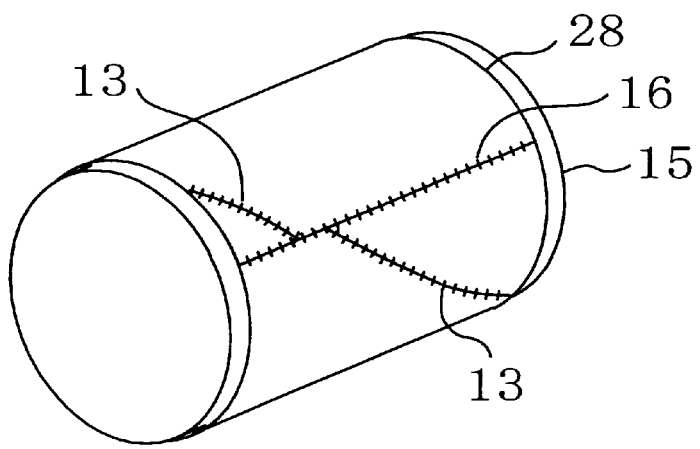
FIG. 12 is a perspective view showing another conventional top fabric wound on the drum for forming a belt.
Figure 13:
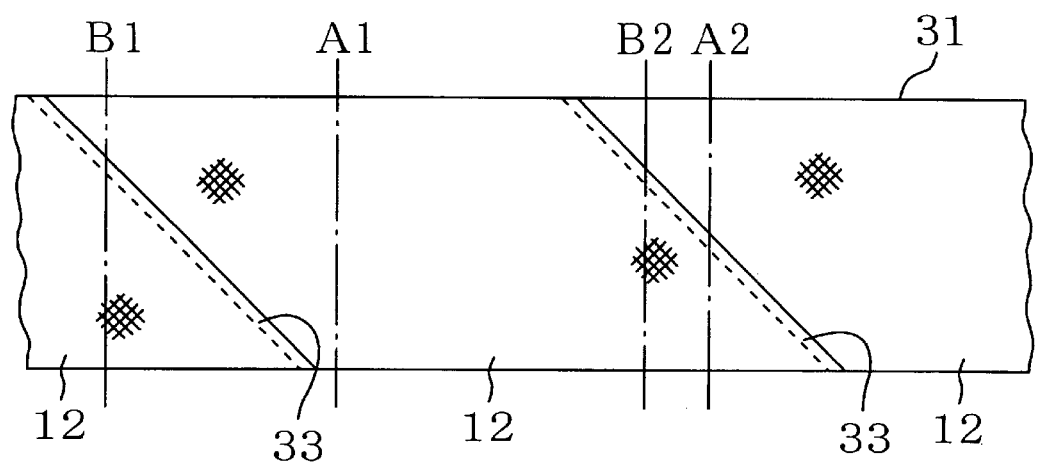
FIG. 13 is a plan view showing a strip formed by a conventional lap joint.
Figure 14:
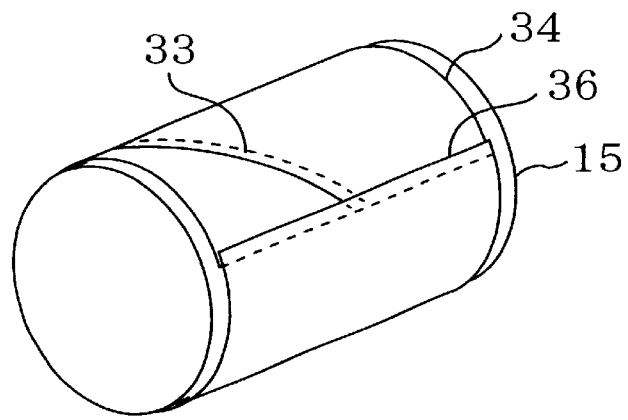
FIG. 14 is a perspective view showing a material for a top fabric formed of the conventional strip, in which the material is wound on the drum for forming a belt.
Figure 15:
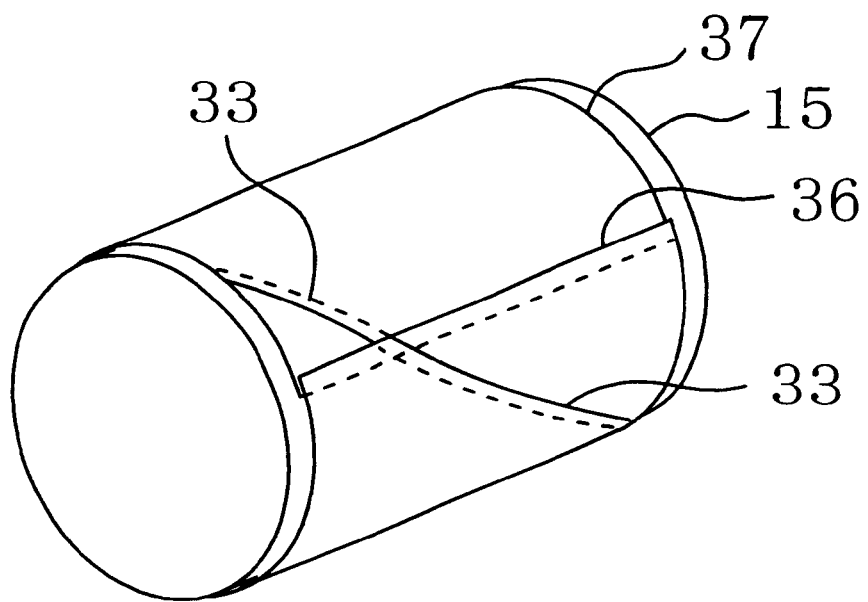
FIG. 15 is a perspective view showing another material for a top fabric formed of the conventional strip, in which the material is wound on the drum for forming a belt.

A belt shown as an embodiment of the present invention in FIG. 1 and belts shown as comparative examples in FIGS. 7 through 9 (all showing partly plan views of the belts) are subjected to a breaking test for a top fabric, in condition to run in open and back face drive as shown in FIG. 10. The belt 21 shown in FIG. 7 has a diagonal joint line 33 constituting a lap joint structure (without crossing a widthwise joint line), the belt 22 shown in FIG. 8 has the diagonal joint line 13 and the widthwise joint line 16 both constituting a butt joint structure with both the joint lines not crossing each other, and the belt 23 shown in FIG. 9 has the diagonal joint line 13 and the widthwise joint line 16 both constituting a butt joint structure with both the joint lines crossing each other. A drive pulley 24 and a driven pulley 25 are flat pulleys with a diameter of 100 mm. The rotational speed of the drive pulley 24 is 4000 rpm, the load of the driven pulley 25 is 8 PS, and the load DW thrown on the test machine is 120 kg. The test was performed at room temperature (20±5° C.). The test results are shown in Table 1.

TABLE 1

| Sample belt | | FIG. 1 belt | FIG. 7 belt | FIG. 8 belt | FIG. 9 belt |
|---|---|---|---|---|---|
| State of breakage | | lap joint: no anomaly butt joint: streaked but not exfoliated | lap joint: no anomaly | butt joint: streaked but not exfoliated | butt joint: streaked and exfoliated from meeting point |
| Running life | ① | no anomaly for 467 hr end of test | no anomaly for 470 hr end of test | no anomaly for 451 hr end of test | exfoliated after 137 hr run |
| | ② | no anomaly for 454 hr end of test | no anomaly for 505 hr end of test | no anomaly for 512 hr end of test | exfoliated after 154 hr run |
| | ③ | no anomaly for 508 hr end of test | no anomaly for 487 hr end of test | no anomaly for 509 hr end of test | exfoliated after 163 hr run |

①, ② and ③ denotes the number of belt subjected to the test (three belts are subjected to the test for each of above four types of belts).

As seen from the table, when the joint section of the lap joint structure and the joint section of the butt joint structure exist singly, they have durability and do not largely impair the running life of the belt. Further, as seen from the table, when the joint sections of the butt joint structure meet each other (in the case of FIG. 9 belt), the top fabric is exfoliated from the meeting point and therefore the durability of the belt is deteriorated. Specifically, even if the joint section of the lap joint structure crosses the joint section of the butt joint structure as in the FIG. 1 belt as an example of this invention, the running life of the belt is not inferior to those of the FIG. 7 and FIG. 8 belts. This assures usefulness of this invention. In addition, in the FIG. 1 belt as an example of this invention, portions of the top fabric overlapped three or more deep are never produced and therefore vibrations and sounds during the belt run are at substantially the same level as in the FIG. 7 belt.

It is noted that "butt joint: streaked" in the above table means that the butt joint section is pulled from both sides so that the joint section develops shallow and narrow grooves in streak form. Furthermore, it can be considered that the reason for the emergence of exfoliation in the top fabric of the FIG. 9 belt is that at the meeting point of the butt joint sections, the seam of one of the joint sections and the seam of the other joint section are overlapped in the back face of the top fabric so that the adhesive strength between the top fabric and the rubber of the belt body is lowered locally at that point.

What is claimed is:

1. A power transmission belt having an outer periphery or an inner periphery which is covered with a cover fabric, wherein the cover fabric is cylindrically formed of a plurality of plain weave fabric pieces joined one to another in each of which warp yarns and weft yarns extend diagonally with respect to a belt lengthwise direction and in opposite directions so as to cross at right angles, and one of joint sections of the cover fabric has a lap joint structure such that adjacent fabric pieces are lap jointed at corresponding ends thereof which extend in a belt widthwise direction with vulcanized rubber interposed therebetween, and the other one or more joint sections of the cover fabric each have a butt joint structure such that adjacent fabric pieces are butt seamed at corresponding ends thereof which extend diagonally to the belt lengthwise direction.

2. The power transmission belt of claim 1, wherein
the cover fabric is a top fabric covering a back face of the belt,
the cover fabric is formed of a plain weave fabric in which warp yarns and weft yarns are diagonally oriented with respect to the belt lengthwise direction and in mutually opposite directions, and includes one or more diagonal joint lines extending diagonally with respect to the belt lengthwise direction and one widthwise joint line extending in the belt widthwise direction, and
the diagonal joint line has the butt joint structure, and the widthwise joint line has the lap joint structure.

* * * * *